3,370,028
EMULSION POLYMERIZATION OF VINYL CHLO-
RIDE USING A FATTY ACID SOAP AND A SUL-
FUR-CONTAINING EMULSIFYING AGENT
Raymond C. De Wald, Amity Township, Pa., assignor to
The Firestone Tire & Rubber Company, Akron, Ohio,
a corporation of Ohio
No Drawing. Continuation-in-part of application Ser. No.
325,506, Nov. 21, 1963. This application June 10, 1966,
Ser. No. 556,560
16 Claims. (Cl. 260—23)

This application is a continuation-in-part of my application Ser. No. 325,506, filed Nov. 21, 1963, now abandoned.

This invention relates to a process for preparing a polyvinyl chloride latex. More particularly, this invention relates to a process for the emulsion polymerization of vinyl chloride and to the novel latex produced thereby.

Polyvinyl chloride is a raw material useful in the preparation of a wide variety of products. Its combination of properties such as hardness, transparency, chemical and age resistance, etc., suit such resins for a wide variety of applications. Homopolymers as well as copolymers of vinyl chloride with other copolymerizable monomers such as vinyl acetate, vinylidene chloride, etc. have long been commercially available.

In addition, polyvinyl chloride has been used as the substrate for preparing graft copolymers with other ethylenically unsaturated monomers. In preparing a polyvinyl chloride latex to serve as a base for graft polymerization, it is conventional to utilize a relatively high amount of a surfactant, i.e., 5 percent or more by weight based on the weight of the monomer, to prepare such a latex at a relatively low solids content, i.e., no more than about 35 percent by weight. Typical of the prior art processes for preparing graft copolymers using a polyvinyl chloride base is U.S. 2,996,470 to Cole et al., wherein a polyvinyl chloride substrate is prepared using about 7.7 percent by weight of an alkyl aryl sulfonate as the surfactant.

It is, of course, desirable to obtain as high a solids content as possible with as low a surfactant dosage as possible. However, for certain uses such as in the production of Xerographic members and like products, the amount of alkyl aryl sulfonate required to obtain a high solids latex renders such latices unsuitable for their intended use. Thus quantities of surfactants substantially in excess of about 0.5 percent cause degradation of the latex electrical properties rendering it unsuitable for the production of Xerographic members. Accordingly, fatty acid soaps have been employed in the production of polymer for this purpose since they do not adversely affect the latex electrical properties. Nevertheless, excessive quantities of such soaps are required to produce a latex of only about 35% solids. Attempts to increase the solids content by further increases in soap concentration have led to gelation due to the extremely small micelles formed. Attempts to utilize very low concentrations of surfactants have resulted in low solids latices and indeed, in unstable latices which also were subject to gelation difficulties.

Accordingly, it is an object of this invention to provide a novel polyvinyl chloride latex which can serve as the substrate for preparing graft copolymers.

Another object of this invention is a process of preparing a low surfactant, high solids latex of polyvinyl chloride.

A still further object is to provide a polyvinyl chloride latex useful for making coating compositions which provide coatings of excellent electrical properties, exceptional clarity, and excellent freedom from water sensitivity.

The present invention is based on the discovery that very small amounts of alkyl sulfates or alkyl sulfonates, when mixed with fatty acid soaps, provide a synergistic effect. The total quantity of surfactant required to obtain a stable polyvinyl chloride latex is greatly reduced, yet much higher solids contents are obtained in the latex.

Generally, the vinyl chloride polymer is a vinyl chloride homopolymer, but up to about 20 percent based on the weight of the total resin composition of one or more comonomers may be used in producing the polyvinyl chloride latex. Monomers which are suitable for producing copolymers with vinyl chloride are well known and include, for instance, vinyl acetate, vinyl propionate, vinyl stearate, vinylidene chloride, styrene, vinyl pyridine, acrylic and methacrylic esters such as methyl acrylate, ethyl acrylate, octyl acrylate, methyl methacrylate, ethyl methacrylate, butyl methacrylate, dodecyl methacrylate and the like, acrylonitrile, alkyl maleates, alkyl itaconates, vinyl ethers and ketones such as methyl vinyl ether, methyl vinyl ketone, methyl isopropenyl ketone and the like, etc. A more complete listing of suitable comonomers useful for polymerizing with vinyl chloride to produce latices according to this invention is found in Krczil "Kurzes Handbuch der polymerisationstechnik—II Mehrstoff—Polymerisation," Edwards Bros., Inc., 1945 pp. 735–37, the item under "Vinyl chlorid."

A high solids latex, according to the present invention, contains at least about 40 percent by weight polymer solids. The novel combination of emulsifiers whose synergistic effect makes possible the preparation of such a high solids latex is a combination of a fatty acid soap and an alkyl sulfate salt or an alkyl aryl sulfonate salt. The alkyl group of the alkyl sulfate salt or the alkyl aryl sulfonate salt contains from 8 to 18 carbon atoms and preferably from 10 to 14 carbon atoms. The alkyl sulfates or alkyl aryl sulfonates are used in the form of their salts such as an alkali metal, ammonium or water-soluble amine salt. The preferred salts are the potassium, sodium, ammonium and water-soluble alkanolamine salts. The preferred water-soluble alkanolamine salt is the diethanolamine salt. A mixture of alkyl sulfates may be used, such as is obtained from the sulfate salt of the alcohol mixture prepared by hydrogenating coconut oil. In addition, mixtures of alkyl aryl sulfonates, or mixtures of sulfates and sulfonates may be used.

The soaps used in combination with the alkyl sulfate salts or alkyl aryl sulfonate salts are the water-soluble salts of the alkyl fatty acids having from 8 to 18 carbon atoms. It is preferred that the soap contain from 8 to 12 carbon atoms and most preferred are capric and lauric acid salts. The salts of the fatty acids constituting the soaps used in the instant invention are the alkali metal, ammonium and water-soluble amine salts of such fatty acids. The preferred salts for the purposes of the present invention are the potassium, sodium, ammonium and water-soluble alkanolamine salts. The preferred water-soluble alkanolamine salt is the diethanolamine salt. Mixtures of fatty acids may be used in preparing the soaps. In any event, the soap may be added as such or the free fatty acid and the desired alkali or mixture of alkalis added separately in the polymerization recipe to form the soap in situ. When forming the soap in situ, the alkalis should be present in an amount at least slightly in excess of the stoichiometric amount.

In accordance with the present invention, polymerization mixtures are prepared which contain from about 0.5 to about 1.5 percent by weight of surfactant based on the weight of monomer to be polymerized. The yield of latex solids, i.e., the vinyl chloride polymer, is of course, generally less than 100 percent due to monomer losses, etc. Nevertheless, a low surfactant latex is produced in accordance with the present invention which contains no more than about 2 percent by weight of surfactant based on the weight of latex solids or resin. As used herein, the term "weight of the surfactant" is the sum of the weight of the acid from which the fatty acid soap is derived and the weight of the sulfate salt, sulfonate salt, or sulfate-sulfonate salt mixture. Stable latices have been prepared in accordance with the invention in which the surfactant content was about 0.5 percent by weight based on the weight of latex solids or resin.

The weight ratio of acid to sulfate or sulfonate needed to obtain a stable latex will vary with the weight of the surfactant and, to a lesser extent, with the specific materials in the surfactant. The total quantity of sulfate and/or sulfonate in the surfactant should not exceed about 0.5 percent by weight based on the weight of monomer. Larger quantities adversely affect the electrical properties of the latex and render it unsuitable for use in the production of polymeric coatings for Xerographic uses. In general, the amount of fatty soap should exceed the total amount of sulfate and/or sulfonate, although such is not absolutely essential in the very low ranges of surfactant. Nevertheless, the preferred and quite superior polymerization system, for the purposes of the present invention, is one in which the total surfactant is about 1 percent, and still more preferably, below 0.75 percent with the amount of fatty acid soap being substantially greater than the amount of sulfate and/or sulfonate. Thus, the superior polymerization system includes surfactant in an amount in the range between about 0.5 to about 1 percent, and preferably, less than about 0.75 percent in which the surfactant consists of a major amount of the fatty acid soap and a minor amount of the sulfate and/or sulfonate salt.

As will be seen from the examples which follow, very minor amounts of the sulfonates and/or sulfates permit very great reductions in the amount of fatty acid soap required to obtain a stable latex of high solids content. Thus, quantities on the order of 0.004 to 0.005 have been found to be an effective amount of sulfate and/or sulfonate to permit preparation of a 50 percent solids latex in which the total surfactant content was on the order of about 1.5 weight percent.

The polymerization can be effected by using a suitable water-soluble free radical catalyst such as a peroxy polymerization catalyst. Suitable catalysts include hydrogen peroxide, sodium or potassium persulfate, percarbonate, peracetate, perborate and the like. Other catalysts include cumene hydroperoxide, t-butyl hydroperoxide, acetone peroxide, etc. The catalyst may be used alone or in association with activating systems such as redox systems involving versivalent metals and mild reducing agents, for example, a potassium persulfate-sodium bisulfite or an ammoniacal copper ion-carbon tetrachloride-sodium bisulfite system. The amount of catalyst added will vary over a wide range but in most cases will be from about 0.01 to about 3 percent by weight of monomer and perferably from about 0.1 to about 2 percent by weight of monomer.

Polymerization is effected by agitating the monomers, emulsifying agents and catalysts in sufficient water to give the desired high solids content and adjusting the temperature to from about 40° centigrade to about 100° centigrade or, in the case of activated systems, from about 0° to about 80° centigrade. The monomer emulsion may also contain various quantities of other components such as polymerization modifiers, accelerators, dyes, pigments, plasticizers, and the like. After polymerization is carried to the necessary degree of completion, generally at least about 75 percent, any unreacted monomers are preferably stripped off.

The resulting latex is eminently suited for use as the substrate in preparing a graft copolymer. When used in this manner, the stability of the latex is such that the latex is used without any additional surfactant or catalyst in preparing the graft copolymer. Thus, the products are eminently suited for use in the production of Xerographic members. The graft monomers are added to the latex and the polymerization of the monomers on to the polyvinyl chloride substrate carried out to produce a high solids content graft copolymer. Any monomer known to those skilled in the art as useful in preparing graft polymers or polyvinyl chloride may be used in this manner including, for example, the graft comonomers disclosed in the copending application of Albert J. Cole, Ser. No. 329,895, filed Nov. 21, 1963, the graft comonomers disclosed by Cole et al., in U.S. 2,996,470, etc.

With the foregoing general discussion in mind, there are given herewith detailed examples for the practice of this invention. All parts and percentages are given by weight.

EXAMPLE 1

| | Grams |
|---|---|
| Vinyl chloride | 65 |
| Water | 65 |
| Potassium persulfate | 0.1 |
| Ammonium hydroxide (28 percent) | [1]0.5 |
| Sodium lauryl sulfate (90 percent) | 0.1 |
| Capric acid | 0.5 |

[1] Cubic centimeter.

A reactor having a rotary stirrer and heating and cooling jacket was provided for the preparation of the latex. The ingredients listed above, with the exception of the vinyl chloride, were charged at 25° centigrade and the stirrer set in motion to dissolve the ingredients. The air in the reactor was evacuated and purged with vinyl chloride vapor. The vinyl chloride of the recipe was then pressured in, the temperature raised to 45° centigrade and minimum agitation continued throughout the reaction to follow. These conditions were maintained for a total of 16 hours at the end of which time the unreacted vinyl chloride was vented.

The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 2

| | Grams |
|---|---|
| Vinyl chloride | 65 |
| Water | 65 |
| Ammonium hydroxide (28 percent) | [1]0.5 |
| Carbon tetrachloride | [1]0.5 |
| Copper sulfate (CuSo$_4$·5H$_2$O) | 0.0005 |
| Sodium bisulfite (meta) | 0.05 |
| Capric acid | 0.5 |
| Sodium lauryl sulfate (90 percent) | 0.05 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 3

| | Grams |
|---|---|
| Vinyl chloride | 65 |
| Water | 65 |
| Sodium perborate (NaBO$_3$·4H$_2$O) | 0.2 |
| Capric acid | 0.5 |
| Potassium hydroxide | 0.16 |
| Sodium lauryl sufate (90 percent) | 0.1 |

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex

EXAMPLE 4

| | Grams |
|---|---|
| Vinyl chloride | 65 |
| Water | 65 |
| Potassium persulfate | 0.05 |
| Capric acid | 0.25 |
| Sodium hydroxide | 0.06 |
| Sodium lauryl sulfate (90 percent) | 0.1 |

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 5

| | Grams |
|---|---|
| Vinyl chloride | 65 |
| Water | 65 |
| Potassium persulfate | 0.1 |
| Ammonium hydroxide (28 percent) | [1] 0.4 |
| Lauric acid | 0.3 |
| Sodium lauryl sulfate (90 percent) | 0.05 |

[1] Cubic centimeter.

Polymerization of the above material was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 6

| | Grams |
|---|---|
| Vinyl chloride | 65 |
| Water | 65 |
| Potassium persulfate | 0.1 |
| Ammonium hydroxide (28 percent) | [1] 0.5 |
| Capric acid | 0.9 |
| Sodium cetyl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 7

| | Grams |
|---|---|
| Vinyl chloride | 65 |
| Water | 65 |
| Potassium persulfate | 0.1 |
| Ammonium hydroxide (28 percent) | [1] 0.5 |
| Capric acid | 0.9 |
| Potassium lauryl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 8

| | Grams |
|---|---|
| Vinyl chloride | 65 |
| Water | 65 |
| Potassium persulfate | 0.1 |
| Ammonium hydroxide (28 percent) | [1] 0.5 |
| Capric acid | 0.9 |
| Ammonium lauryl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 9

| | Grams |
|---|---|
| Vinyl chloride | 65 |
| Water | 65 |
| Potassium persulfate | 0.1 |
| Ammonium hydroxide (28 percent) | [1] 0.5 |
| Capric acid | 0.9 |
| Sodium octyl sulfate | 0.1 |

[1] Cubic centimeter

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 10

| | Grams |
|---|---|
| Vinyl chloride | 65 |
| Water | 65 |
| Potassium persulfate | 0.1 |
| Ammonium hydroxide (28 percent) | [1] 0.5 |
| Capric acid | 0.9 |
| Diethanolamine lauryl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 11

| | Grams |
|---|---|
| Vinyl chloride | 65 |
| Water | 65 |
| Potassium persulfate | 0.1 |
| Ammonium hydroxide (28 percent) | [1] 0.5 |
| Myristic acid | 0.5 |
| Sodium lauryl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 12

| | Grams |
|---|---|
| Vinyl chloride | 65 |
| Water | 65 |
| Potassium persulfate | 0.1 |
| Ammonium hydroxide (28 percent) | [1] 0.5 |
| Palmitic acid | 0.5 |
| Sodium lauryl sulfate | 0.1 |

[1] Cubic centimeter.

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLE 13

| | Grams |
|---|---|
| Vinyl chloride | 65 |
| Water | 65 |
| Potassium persulfate | 0.1 |
| Diethanolamine | 0.55 |
| Capric acid | 0.9 |
| Sodium lauryl sulfate | 0.1 |

Polymerization of the above materials was carried out as set forth in Example 1. The resulting latex is useful as a substrate for grafted monomers without the use of any additional surfactant or catalyst. Further, the latex has good mechanical stability, permitting preparation of graft copolymers directly therein without flocculation. The latex is also useful in other art-recognized applications, especially those where low emulsifier content is desirable.

EXAMPLES 14–42

The basic formulation used in these examples was as follows:

| | Grams |
|---|---|
| Vinyl chloride | 65 |
| Water | 65 |
| Ammonium hydroxide (28 percent) | [1] 0.5 |
| Potassium persulfate | 0.1 |
| Capric acid, varied. | |
| Sodium lauryl sulfate, varied. | |

[1] Cubic centimeter

The polymerizations were carried out as in Example 1. The following table sets forth the amount of surfactant and the nature of the polymerization product:

| Example | Sodium Lauryl Sulfate (Grams) | Capric Acid (Grams) | Product |
|---|---|---|---|
| 14 | 0.5 | 0 | Gel. |
| 15 | 0.4 | 0.1 | Latex. |
| 16 | 0.3 | 0.2 | Do. |
| 17 | 0.2 | 0.3 | Do. |
| 18 | 0.1 | 0.4 | Do. |
| 19 | 0 | 0.5 | Gel. |
| 20 | 1.2 | 0 | Gel. |
| 21 | 0.95 | 0.05 | Gel. |
| 22 | 0.90 | 0.10 | Gel. |
| 23 | 0.85 | 0.15 | Gel. |
| 24 | 0.80 | 0.20 | Gel. |
| 25 | 0.75 | 0.25 | Gel. |
| 26 | 0.70 | 0.30 | Gel. |
| 27 | 0.65 | 0.35 | Gel. |
| 28 | 0.60 | 0.40 | Gel. |
| 29 | 0.55 | 0.45 | Gel. |
| 30 | 0.50 | 0.50 | Latex. |
| 31 | 0.45 | 0.55 | Do. |
| 32 | 0.40 | 0.60 | Do. |
| 33 | 0.35 | 0.65 | Do. |
| 34 | 0.30 | 0.70 | Do. |
| 35 | 0.25 | 0.75 | Do. |
| 36 | 0.20 | 0.80 | Do. |
| 37 | 0.15 | 0.85 | Do. |
| 38 | 0.10 | 0.90 | Do. |
| 39 | 0.05 | 0.95 | Do. |
| 40 | 0.04 | 0.96 | Do. |
| 41 | 0.03 | 0.97 | Gel. |
| 42 | 0 | 1.2 | Gel. |

EXAMPLES 43–55

The basic formulation in these examples was as follows:

| | Grams |
|---|---|
| Vinyl chloride | 65 |
| Water | 65 |
| Ammonium hydroxide (28 percent) | [1] 0.5 |
| Potassium persulfate | 0.1 |
| Lauric acid, varied. | |
| Sodium lauryl sulfate, varied. | |

[1] Cubic centimeter.

The polymerizations were carried out as in Example 1. The following table shows the amount of surfactant and the nature of the polymerization product:

| Example | Sodium Lauryl Sulfate (Grams) | Lauric Acid (Grams) | Product |
|---|---|---|---|
| 43 | 0.4 | 0.1 | Gel. |
| 44 | 0.3 | 0.2 | Latex. |
| 45 | 0.2 | 0.3 | Do. |
| 46 | 0.1 | 0.4 | Do. |
| 47 | 0.9 | 0.1 | Gel. |
| 48 | 0.8 | 0.2 | Gel. |
| 49 | 0.7 | 0.3 | Gel. |
| 50 | 0.6 | 0.4 | Gel. |
| 51 | 0.5 | 0.5 | Gel. |
| 52 | 0.4 | 0.6 | Latex. |
| 53 | 0.3 | 0.7 | Do. |
| 54 | 0.2 | 0.8 | Do. |
| 55 | 0.1 | 0.9 | Do. |

The latex products in Examples 44–46 contained 50 percent total solids by weight. The products of Examples 52–55 contained 45 percent total solids. Each of these latices is useful as a substrate for grafted monomers without the use of any additional surfactant or catalyst. Further, the latices have good mechanical stability, permitting preparation of graft copolymers directly therein without flocculation. The latices are also useful in other art-recognized applications, especially those where low emulsifier content is desirable.

EXAMPLE 56

This example illustrates the use of salts of alkyl aryl sulfonates in lieu of the alkyl sulfate salts used in the previous examples. The polymerization recipe was:

| | Grams |
|---|---|
| Vinyl chloride | 65 |
| Water | 78 |
| Ammonium hydroxide (28 percent) | [1] 0.5 |
| Potassium persulfate | 0.1 |
| Lauric acid | 0.9 |
| Sodium dodecyl benzene sulfonate | 0.1 |

[1] Cubic centimeter.

Polymerization was carried out as in Example 1. The resulting latex contained about 44 percent total solids by weight. The latex is useful as a substrate for preparation of graft copolymers directly therein without flocculation. The latex is also useful in other art-recognized applications, especially those where low emulsifier content is desirable.

EXAMPLES 57–71

These examples further illustrate the use of alkyl aryl sulfonate salts in practicing the invention. The polymerization recipe was:

| | Grams |
|---|---|
| Vinyl chloride | 65 |
| Water | 65 |
| Ammonium hydroxide (28 percent) | [1] 0.5 |
| Potassium persulfate | 0.1 |
| Capric acid, varied. | |
| Sodium dodecyl benzene sulfonate, varied. | |

[1] Cubic centimeter.

The polymerizations were carried out as in Example 1. The following table shows the amount of surfactant and the nature of the resulting products:

| Example | Sodium Dodecyl Benzene Sulfonate (Grams) | Capric Acid (Grams) | Product |
|---|---|---|---|
| 57 | 0.4 | None | Gel. |
| 58 | 0.3 | 0.1 | Latex. |
| 59 | 0.3 | 0.2 | Do. |
| 60 | 0.2 | 0.3 | Do. |
| 61 | 0.1 | 0.4 | Gel. |
| 62 | 0.1 | 0.5 | Latex. |
| 63 | None | 0.5 | Gel. |
| 64 | 0.02 | 0.98 | Gel. |
| 65 | 0.03 | 0.97 | Latex. |
| 66 | 0.05 | 0.95 | Do. |
| 67 | 0.1 | 0.9 | Do. |
| 68 | 0.5 | 0.5 | Do. |
| 69 | 0.7 | 0.3 | Do. |
| 70 | 0.9 | 0.1 | Gel. |
| 71 | 1.0 | None | Gel. |

Each of the latex products is useful as a substrate for grafted monomers without the use of any additional surfactant. Further, the latices have good mechanical stability, permitting preparation of graft copolymers directly therein without flocculation. The latices are also useful in other art-recognized applications, especially those where low emulsifier content is desirable.

EXAMPLES 72–75

These examples illustrate the preparation of high solids, low surfactant copolymer latices. The polymerization recipe was as follows:

|  | Grams |
|---|---|
| Vinyl chloride | 58.5 |
| Water | 78.0 |
| Ammonium hydroxide (28 percent) | ¹0.5 |
| Potassium persulfate | 0.1 |
| Sodium lauryl sulfate | 0.1 |
| Capric acid | 0.9 |
| Ethylenically unsaturated comonomer | 6.5 |

¹ Cubic centimeter.

Polymerizations were carried out as in Example 1 except that polymerization conditions were maintained for 24 hours instead of 16 hours. The following table shows the comonomers used and the nature of the polymerization product.

| Example | Comonomer | Product |
|---|---|---|
| 72 | Methyl Methacrylate | Latex 44.4 percent total solids. |
| 73 | Ethyl Ecrylate | Latex 45.2 percent total solids. |
| 74 | Vinylidene Chloride | Latex 43.6 percent total solids. |
| 75 | Dibutyl Maleate | Latex 42.0 percent total solids. |

From the foregoing examples, it is seen that when the surfactant is composed of a capric acid soap and sodium lauryl sulfate, and the weight of the surfactant is about 0.75 percent, the weight ratio of acid to sulfate can be varied between about 0.11 and about 9.0. When using the same materials at a surfactant weight of about 1.5 percent, the weight ratio of acid to sulfate needed to obtain stable latices varies from about 1.0 to about 24.0. If sodium dodecyl benzene sulfonate is substituted for the sodium lauryl sulfate in the above formulations the ratios are from about 0.3 to about 3.0 at a surfactant weight of about 0.75 percent and from about 0.25 to about 32.0 at a surfactant weight of about 1.5 percent. Suitable ratios for any particular materials at any specific surfactant weight can be readily determined by empirical methods. The important fact to be noted is that stable, high solids (40 percent by weight or more) latices can be prepared with very low surfactant content (not more than about 2.0 percent).

What is claimed is:
1. An aqueous latex comprising:
    (a) a continuous aqueous phase;
    (b) as a dispersed phase, at least 40 percent by weight based on total latex of a vinyl chloride resin selected from the group consisting of a homopolymer of vinyl chloride and copolymer thereof with up to 20 percent of ethylenically unsaturated compounds copolymerizable therewith, and
    (c) from about 0.5 to about 2.0 percent by weight of a surfactant consisting essentially of a mixture of
        (1) an effective amount up to 0.5 percent by weight of a salt selected from the group consisting of the alkali metal, ammonium, and water-soluble amine salts of alkyl sulfates, alkyl aryl sulfonates and mixtures thereof, the alkyl groups of said salts containing from 8 to 18 carbon atoms, and
        (2) an effective amount of a salt selected from the group consisting of the alkali metal, ammonium, and water-soluble amine salts of fatty acids containing from 8 to 18 carbon atoms. the amount of said fatty acid salt exceeding the amount of salt (1) when the total surfactant is less than about 0.75 percent by weight,
the quantities of said surfactant and the components thereof being based on the weight of resin (b) with the amount of salt (2) calculated as the weight of fatty acid from which salt (2) is derived.

2. An aqueous latex in accordance with claim 1 wherein the alkyl group of salt (1) contains from 10 to 14 carbon atoms and fatty acid salt (2) contains from 8 to 12 carbon atoms.

3. The aqueous latex of claim 2 wherein said salt (1) is an alkyl sulfate salt.

4. The aqueous latex of claim 2 wherein said salt (1) is an alkyl aryl sulfonate salt.

5. An aqueous latex in accordance with claim 1 in which the amount of salt (2) is at least equal to the amount of salt (1).

6. An aqueous latex in accordance with claim 1 wherein said surfactant mixture (c) consists of ammonium caprate and sodium lauryl sulfate, the amount of said caprate exceeding substantially the amount of said sulfate.

7. An aqueous latex in accordance with claim 1 wherein said surfactant mixture (c) consists of ammonium laurate and sodium lauryl sulfate, the amount of said laurate exceeding substantially the amount of said sulfate.

8. An aqueous latex in accordance with claim 1 wherein said surfactant mixture (c) consists of ammonium caprate and sodium dodecyl benzene sulfonate, the amount of said caprate exceeding substantially the amount of said sulfonate.

9. Process for emulsion polymerization of a monomer material selected from the group consisting of vinyl chloride and mixtures thereof with up to about 20 percent by weight based on the total weight of other ethylenically unsaturated monomers copolymerizable therewith which comprises polymerizing said material at a temperature of from about 0° to about 100° centigrade in water containing a free radical polymerization catalyst, said water constituting no more than about 60 percent by weight of the polymerization mixture, and from about 0.5 to about 1.5 percent by weight based on monomer, of a surfactant, said surfactant consisting essentially of a mixture of
    (1) an effective amount up to 0.5 percent by weight of a salt selected from the group consisting of the alkali metal, ammonium, and water-soluble amine salts of alkyl sulfates, alkyl aryl sulfonates and mixtures thereof, the alkyl groups of said salts containing from 8 to 18 carbon atoms, and
    (2) an effective amount of a salt selected from the group consisting of the alkali metal, ammonium, and water-soluble amine salts of fatty acids containing from 8 to 18 carbon atoms, the amount of said fatty acid salt exceeding the amount of salt (1) when the total surfactant is less than about 0.75 percent by weight.

the quantity of said surfactant being calculated as the sum of the weight of salt (1) and the weight of fatty acid from which salt (2) is derived whereby a stable, low surfactant latex containing at least about 40 percent by weight of polymerized product is obtained.

10. A process in accordance with claim 9 wherein the alkyl group of salt (1) contains from 10 to 14 carbon atoms and fatty acid salt (2) contains from 8 to 12 carbon atoms.

11. A process in accordance with claim 9 wherein said salt (1) is an alkyl sulfate salt.

12. A process in accordance with claim 9 wherein said salt (1) is an alkyl aryl sulfonate salt.

13. A process in accordance with claim 9 in which the amount of salt (2) is at least equal to the amount of salt (1).

14. A process in accordance with claim 9 wherein said surfactant mixture consists of ammonium caprate and sodium lauryl sulfate, the amount of said caprate exceeding substantially the amount of said sulfate.

15. A process in accordance with claim 9 wherein said surfactant mixture consists of ammonium laurate and sodium lauryl sulfate, the amount of said laurate exceeding substantially the amount of said sulfate.

16. A process in accordance with claim 9 wherein said surfactant mixture consists of ammonium caprate and sodium dodecyl benzene sulfonate, the amount of said caprate exceeding substantially the amount of said sulfonate.

References Cited
UNITED STATES PATENTS

| | | | |
|---|---|---|---|
| 2,140,048 | 12/1938 | Fikentscher et al. | 260—23 |
| 2,493,965 | 1/1950 | Haefele | 260—29.6 |
| 2,562,440 | 7/1951 | Staudinger et al. | 260—29.6 |
| 2,635,055 | 4/1953 | Figdor | 260—29.6 |
| 2,674,593 | 4/1954 | Condo et al. | 260—92.8 |
| 2,897,167 | 7/1959 | Dreisbach et al. | 260—23.7 |
| 3,226,350 | 12/1965 | Smith et al. | 260—23 |

DONALD E. CZAJA, *Primary Examiner.*

LEON J. BERCOVITZ, *Examiner.*

R. A. WHITE, *Assistant Examiner.*